United States Patent
Chainani et al.

(10) Patent No.: US 10,936,571 B1
(45) Date of Patent: Mar. 2, 2021

(54) UNDO BASED LOGICAL REWIND IN A MULTI-TENANT SYSTEM

(71) Applicant: salesforce.com, Inc., San Francisco, CA (US)

(72) Inventors: Mikhail Chainani, San Francisco, CA (US); William Dumaresq, San Francisco, CA (US); Xiaodan Wang, San Francisco, CA (US)

(73) Assignee: salesforce.com, Inc., San Francisco, CA (US)

( * ) Notice: Subject to any disclaimer, the term of this patent is extended or adjusted under 35 U.S.C. 154(b) by 0 days.

(21) Appl. No.: 15/929,353

(22) Filed: Apr. 28, 2020

(51) Int. Cl.
*G06F 16/22* (2019.01)
*G06F 9/46* (2006.01)
*G06F 16/21* (2019.01)

(52) U.S. Cl.
CPC .......... *G06F 16/2282* (2019.01); *G06F 9/466* (2013.01); *G06F 16/219* (2019.01)

(58) Field of Classification Search
CPC ..... G06F 16/2282; G06F 16/219; G06F 9/466
USPC ....................................................... 707/648
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |

(Continued)

OTHER PUBLICATIONS

Vandiver, Ben, et al., "Eon Mode: Bringing the Vertica Columnar Database to the Cloud", SIGMOD '18, Houston, TX, Jun. 10-15, 2018, pp. 797-809.*

*Primary Examiner* — Robert Stevens
(74) *Attorney, Agent, or Firm* — LKGlobal | Lorenz & Kopf, LLP (57) ABSTRACT

Methods and systems for providing a rewind of table data in a data management system include: storing a table having table data that defines a plurality of rows and a plurality of columns that define a plurality of cells; capturing change data associated with changes to at least one of the plurality of rows, the plurality of columns, and the plurality of cells; associating the change data with a transaction having a transaction identifier; storing the transaction and the change data in a change bus; retrieving the change data from the change bus based on a rewind request; performing a rewind of a subset of the changes by performing a reverse operation of the change data relating to the subset of changes and according to a reverse operation order; and outputting a clone of the table based on the rewind of the changes of the table.

20 Claims, 4 Drawing Sheets

(56) References Cited

U.S. PATENT DOCUMENTS

| | | | |
|---|---|---|---|
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,277,900 B1* | 10/2007 | Ganesh ............... G06F 16/2477 707/682 |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,484,166 B2* | 7/2013 | Gower ............... G06F 11/1474 707/678 |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,650,169 B1* | 2/2014 | Jacobs ............... G06F 16/2477 707/704 |
| 8,880,480 B2* | 11/2014 | Kundu ............... G06F 16/2358 707/682 |
| 10,469,330 B1* | 11/2019 | Roth ....................... H04L 41/22 |
| 10,558,648 B2* | 2/2020 | Lu ........................... G06F 16/27 |
| 10,733,057 B2* | 8/2020 | Bentley ............... G06F 16/284 |
| 2001/0044791 A1 | 11/2001 | Richter et al. |
| 2002/0007363 A1* | 1/2002 | Vaitzblit ............ G06F 11/1471 |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian P et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2015/0039566 A1* | 2/2015 | Baumann ............ G06F 11/1446 707/684 |
| 2016/0147786 A1* | 5/2016 | Andrei ................ G06F 16/1756 707/695 |
| 2020/0320059 A1* | 10/2020 | Kumar ............... G06F 16/2358 |

\* cited by examiner

UNDO BASED LOGICAL REWIND IN A MULTI-TENANT SYSTEM

TECHNICAL FIELD

Embodiments of the subject matter described herein relate generally to database systems, and more particularly to techniques for restoring a state of a database to a time in the past.

BACKGROUND

Data management systems store data. The data can be stored, for example, as a table having rows and columns that define a number of cells. The data can be stored for multiple tenants in a multi-tenant system.

Data management systems process the stored data based on certain defined table operations. The table operations can be performed on a cell, a group of cells, a row, a group of rows, a column, a group of columns, etc. In some instances, it may be desirable to restore the data saved in the tables or the entire database to values of the past. In order to allow for restoring of the data saved in the tables, data managements systems periodically store snapshots of the database (e.g., every hour, once a day, once a week, etc.). Such storage requires additional memory and processing time.

Accordingly, it would be desirable to restore a state of a table in a database without having to store a such snapshots. It would be further desirable to restore states in a more flexible manner (e.g., around the axes of tenant, table, rows, etc.).

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Disclosed herein are systems and methods for processing data stored by a data management system. More particularly, the subject matter described herein discloses apparatus, systems, techniques and articles for processing data of a table in a data management system to automatically provide suggestions of related columns for performing table operations. The subject matter described herein further discloses apparatus, systems, techniques and articles for processing data of a table in a data management system to automatically provide suggestions of table operations that can be performed on related columns. The disclosure provides many different embodiments, or examples, for implementing different features of the provided subject matter. The following detailed description is merely exemplary in nature and is not intended to limit the invention or the application and uses of the invention. Furthermore, there is no intention to be bound by any theory presented in the preceding background or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
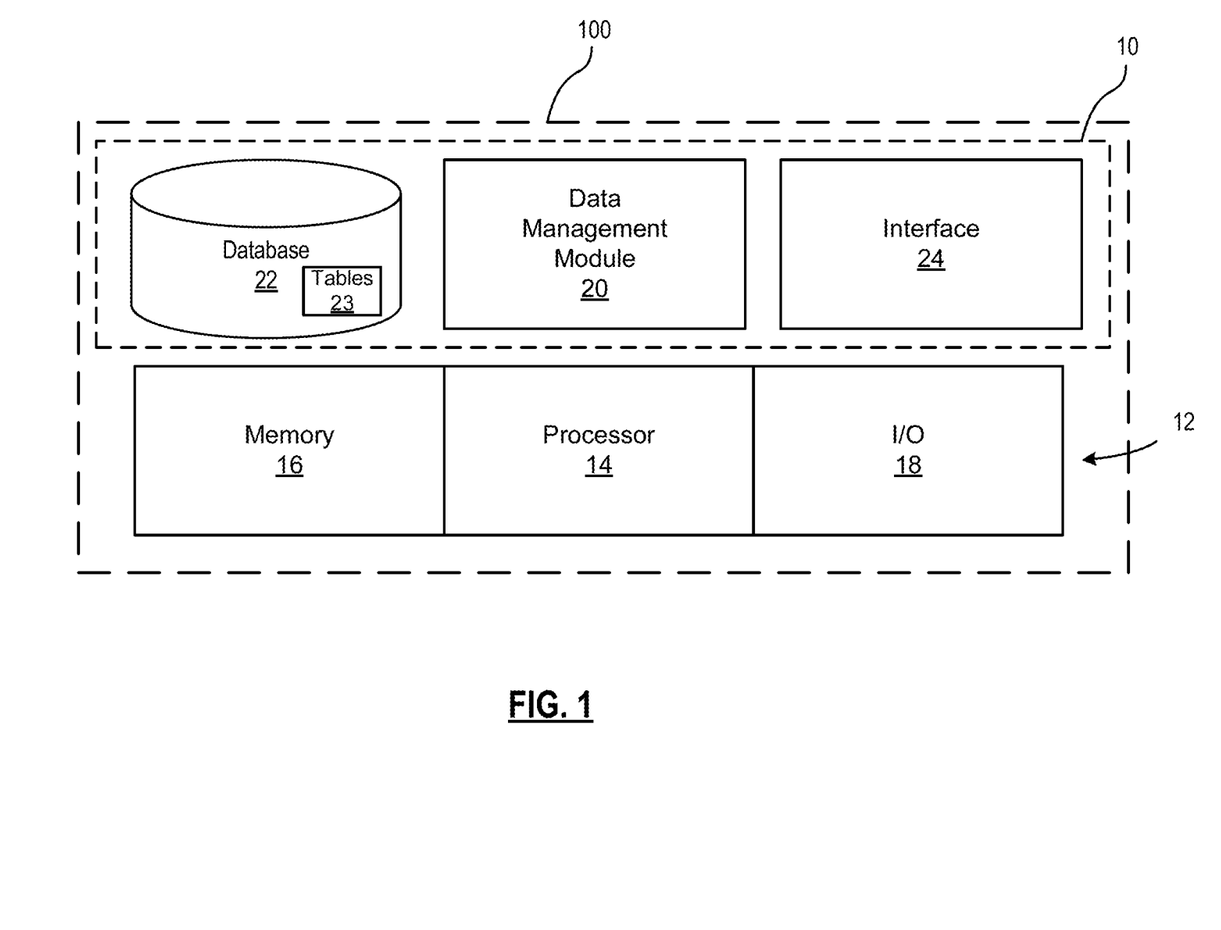
FIG. 1 is a block diagram of an example data management system that may be implemented in the context of a computing environment, in accordance with various embodiments.

Turning now to the figures where a data management system 10 is shown and described in accordance with various embodiments. With particular reference to FIG. 1, in various embodiments, the exemplary data management system 10 may be implemented in the context of a computing environment 100. The computing environment 100 operates with any sort of conventional processing hardware 12, such as a processor 14, memory 16, input/output features 18 and the like. The input/output features 18 generally represent the interface(s) to networks (e.g., to a network, or any other local area, wide area or other network), mass storage, display devices, data entry devices and/or the like. The processor 14 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 16 represents any non-transitory short or long term storage or other computer-readable media capable of storing programming instructions for execution on the processor 14, including any sort of random access memory (RAM), read only memory (ROM), flash memory, magnetic or optical mass storage, and/or the like. The computer-executable programming instructions, when read and executed by the processor 14, cause the processor 14 to create, generate, or otherwise facilitate tasks, operations, functions, and/or processes described herein. It should be noted that the memory 16 represents one suitable implementation of such computer-readable media, and alternatively or additionally, the processor 14 could receive and cooperate with external computer-readable media that is realized as a portable or mobile component or application platform, e.g., a portable hard drive, a USB flash drive, an optical disc, or the like.

The data management system 10 is shown to include a data management module 20 that interfaces with a database 22 that stores data. In various embodiments, the data is stored in tables 23 having a table format with a plurality of rows and columns. In various embodiments, the data management module 20 manages and displays certain data from the database 22 in an interface 24. The interface may display the table data according to the table format or some other format. In various embodiments, the data management module 20 further provides for methods, systems, and techniques for processing the stored data and changes to the stored data such that changes to the data can be reversed or rewound to any point in time without having to store any type of snapshots. The data management module 20 further provides for methods, systems, and techniques for processing the stored data and changes to the stored data such that states can be restored in a more flexible manner (e.g., around the axes of tenant, table, rows, etc.). For instance, restores can be performed on all rows in table T, for tenant X where value of column C>5, etc.

Figure 2:
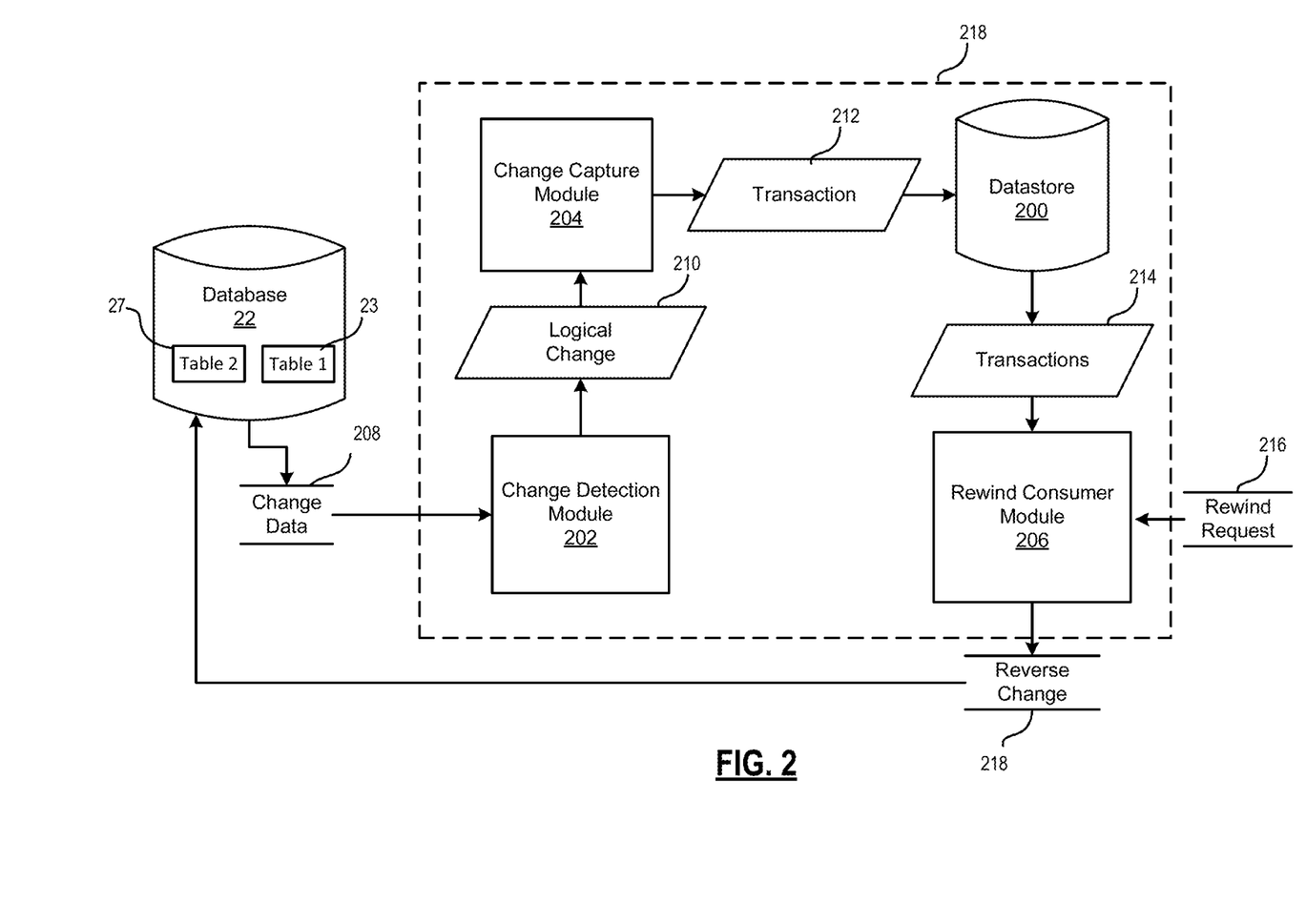
FIG. 2 is a dataflow diagram depicting an example system of the data management system for providing rewind capabilities, in accordance with various embodiments.

With reference now to FIG. 2, a dataflow diagram depicts a portion of an exemplary data management system 10 for automatically providing rewind capabilities to data stored in the database. As can be appreciated, various exemplary embodiments of the data management system 10, according to the present disclosure, may include any number of modules and/or sub-modules. In various exemplary embodiments, the modules and sub-modules shown in FIG. 2 may be combined and/or further partitioned to similarly provide rewind capabilities in an automated manner. In various embodiments, the data management system 10 interfaces with the database 22 of FIG. 1, and includes a datastore 200, a change detection module 202, a change capture module 204, and a rewind consumer module 206.

In various embodiments, the change detection module 202 obtains change data 208 detailing changes to the tables 23 in the database 22. The change data 208 includes information identifying physical changes to the tables 23 (e.g., change operation, memory location, value before, value after, etc.). In various embodiments, the change detection module 202 detects the changes as they occur or can determine the changes from a change log file maintained by a database application. The change detection module 202 collects the change data 208 based on a time of the change and converts the changes from physical changes (e.g., modification to one or more data files) relating to the specific table 23 and/or database 22 to logical changes 210 (e.g., modifying the column values of one or more rows) relating to the table 23 itself. The change detection module 202 associates the time of change with the logical change.

The change capture module 204 receives the logical changes 210 and, based thereon, assembles transaction data 212 that is stored in the datastore 200. In various embodiments, the change capture module 204 identifies related logical changes and assigns them a transaction. The transaction is defined to include data defining the transaction such as, but not limited to, a transaction identifier, a transaction descriptor, a database session, a user identifier, and pointers to the associated changes. As can be appreciated, the transactions can include other data in various embodiments.

The datastore 200 stores the assembled transaction data 212. In various embodiments, the datastore 200 is an ordered change bus including a database of tables. In various embodiments, the datastore 200 can be stored in storage that is separate from (and less complex and/or cheaper than) the database 22. For example, a first table stores the transactions and one or more other tables store the associated changes. The ordered change bus stores the transactions and the changes in order by time. For example, the current transaction (Tc) is saved on top while the older transactions (Tc-1, Tc-2, Tc-3, etc.) are saved in reverse order below. The changes for each transaction are saved with the most current change (Cc) saved on top and the older changes (Cc-1, Cc-2, Cc-3) saved in reverse order below and according to the logical format.

The rewind consumer module 206 receives as input a rewind request 216. The rewind request 216 may indicate a point in time or a specific change to rewind a table or multiple tables to. The rewind consumer module 206 performs a rewind of the information (or an undo of the changes) in the table or tables based on the rewind request 216 and transactions 214 retrieved from the first datastore 200. In particular, the transactions 214 are retrieved from the first datastore 200 based on the rewind request 216. The changes are filtered to reflect the particular changes the user desires to rewind or undo. The reverse of the remaining changes is then performed on the table or tables 23 to produce a clone 27.

In one example, when the rewind request 216 includes a point in time in which a table is to be rewound, the rewind consumer module 206 retrieves the transactions 214 between the current time and the requested point in time and filters the changes in the transactions between the current time and the requested point in time. The rewind consumer module 206 then performs the rewinds of each of the remaining transactions in reverse time order (e.g., from current time to the point in time). In various embodiments, the change is rewound by interpreting the change data and performing a reverse operation.

Figure 3:
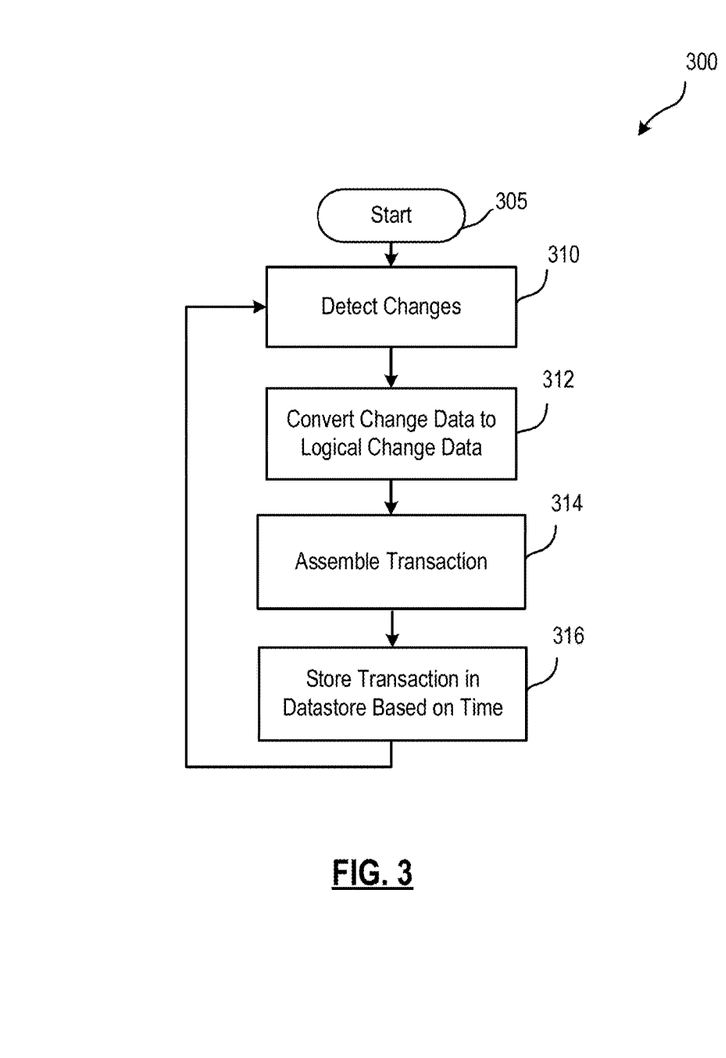
FIGS. 3 and 4 are process flowcharts depicting example processes that may be performed by the data management system for providing rewind capabilities, in accordance with various embodiments.
Figure 4:
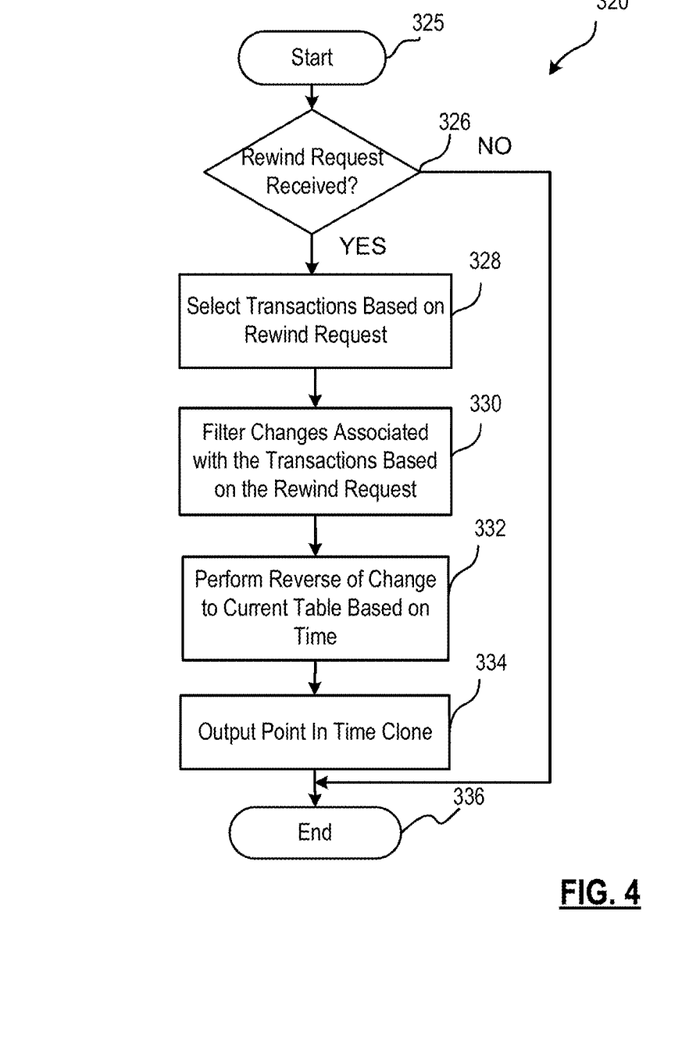

With reference now to FIGS. 3 and 4 and with continued reference to FIGS. 1 and 2, process flowcharts depict example processes 300, 320 for providing rewind capabilities in a data management system. As can be appreciated in light of the disclosure, the order of operations performed by the processes 300, 320 is not limited to the sequential execution as illustrated in FIGS. 3 and 4 but may be performed in one or more varying orders as applicable and in accordance with the present disclosure. In various embodiments, the processes 300, 320 can be scheduled to run based on one or more predetermined events or run automatically based on an occurrence of one or more events in the data management system. This example processes 300, 320 (and other processes described herein) may be implemented at least partially with a multi-tenant database system a, e.g., by one or more processors configured to receive or retrieve information, process the information, store results, and transmit the results. The example processes 300, 320 may also be implemented at least partially with a single tenant database system.

In FIG. 3, process 300 stores change information in the change bus. In various embodiments, the process 300 may begin at 305. At operation 310, changes to the table are detected. A time of change is associated with the change and the change data is converted from physical change data to logical change data at operation 312. A transaction is created, and related logical changes are grouped and associated with the transaction based on time at operation 314. The transaction and the associated changes are then saved in the change bus based on time at operation 316. Thereafter, the process continues with monitoring for more changes at 310.

In FIG. 4, the process 320 generates a point in time clone of a selected table or tables for a tenant in the database. In various embodiments, the process 320 may begin at 325. It is determined whether a rewind request is received at operation 326. When a rewind request is received at operation 326, one or more transactions relating to the rewind request (e.g., based on the time or type of change) are retrieved from the change bus at operation 328. Optionally, depending on the rewind request, changes are filtered from the one or more transactions such that a subset of changes are selected at operation 330. The reverse of the selected changes is performed to undo the change on the current table or tables based on the time associated with the change (reverse time order) to create a point in time clone at operation 332. The point in time clone is then output for use at 334. Thereafter, the method may end at 336 or continue with other processing.

Figure 5:
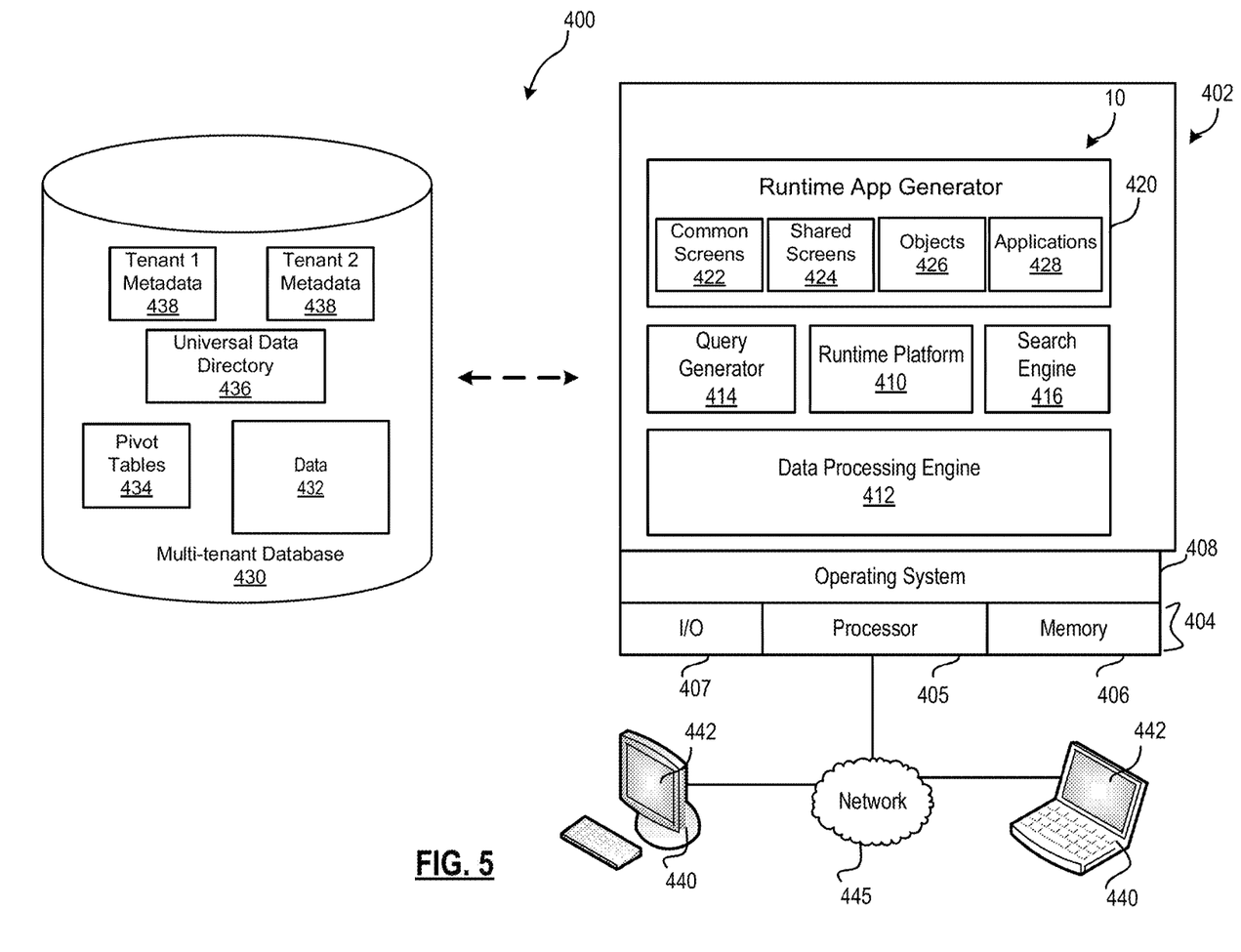
FIG. 5 is a block diagram of the example data management system that may be implemented in the context of a multi-tenant system as the computing environment, in accordance with various embodiments.

With particular reference to FIG. 5, in various embodiments, the exemplary data management system 10 may be implemented in the context of a multi-tenant system 400. As can be appreciated, the data management system 10 may be implemented in other systems such as a single tenant system or a personal computing system and is not limited to the present example. For exemplary purposes, the data management system 10 will be discussed hereinafter in the context of the multi-tenant system 400.

The example multi-tenant system 400 of FIG. 4 includes a server 402 that dynamically creates and supports virtual applications 428 based upon data 432 from a common database 430 that is shared between multiple tenants, alternatively referred to herein as a multi-tenant database. Data and services generated by the virtual applications 428 are provided via a network 445 to any number of client devices 440, as desired. Each virtual application 428 is suitably generated at run-time (or on-demand) using a common application platform 410 that securely provides access to the data 432 in the database 430 for each of the various tenants subscribing to the multi-tenant system 400.

As used herein, a "tenant" or an "organization" should be understood as referring to a group of one or more users or entities that shares access to common subset of the data within the multi-tenant database 430. In this regard, each tenant includes one or more users associated with, assigned to, or otherwise belonging to that respective tenant. To put it another way, each respective user within the multi-tenant system 400 is associated with, assigned to, or otherwise belongs to a particular tenant of the plurality of tenants supported by the multi-tenant system 400. Tenants may represent customers, customer departments, business or legal organizations, and/or any other entities that maintain data for particular sets of users within the multi-tenant system 400 (i.e., in the multi-tenant database 430). For example, the application server 402 may be associated with one or more tenants supported by the multi-tenant system 400. Although multiple tenants may share access to the server 402 and the database 430, the particular data and services provided from the server 402 to each tenant can be securely isolated from those provided to other tenants (e.g., by restricting other tenants from accessing a particular tenant's data using that tenant's unique organization identifier as a filtering criterion). The multi-tenant architecture therefore allows different sets of users to share functionality and hardware resources without necessarily sharing any of the data 432 belonging to or otherwise associated with other tenants.

In various embodiments, the server 402 is implemented using one or more actual and/or virtual computing systems that collectively provide the dynamic application platform 410 for generating the virtual applications 428. For example, the server 402 may be implemented using a cluster of actual and/or virtual servers operating in conjunction with each other, typically in association with conventional network communications, cluster management, load balancing and other features as appropriate. The server 402 operates with any sort of conventional processing hardware 404, such as a processor 405, memory 406, input/output features 407 and the like. The input/output features 407 generally represent the interface(s) to networks (e.g., to the network 445, or any other local area, wide area or other network), mass storage, display devices, data entry devices and/or the like. The processor 405 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 406 represents any non-transitory short or long term storage or other computer-readable media capable of storing programming instructions for execution on the processor 405, including any sort of random access memory (RAM), read only memory (ROM), flash memory, magnetic or optical mass storage, and/or the like. The computer-executable programming instructions, when read and executed by the server 402 and/or processor 405, cause the server 402 and/or processor 405 to create, generate, or otherwise facilitate the application platform 410 and/or virtual applications 428 and perform one or more additional tasks, operations, functions, and/or processes described herein. It should be noted that the memory 106 represents one suitable implementation of such computer-readable media, and alternatively or additionally, the server 402 could receive and cooperate with external computer-readable media that is realized as a portable or mobile component or application platform, e.g., a portable hard drive, a USB flash drive, an optical disc, or the like.

The application platform 410 is any sort of software application or other data processing engine that generates the virtual applications 428 that provide data and/or services to the client devices 440. In a typical embodiment, the application platform 410 gains access to processing resources, communications interfaces and other features of the processing hardware 104 using any sort of conventional or proprietary operating system 408. The virtual applications 128 are typically generated at run-time in response to input received from the client devices 440. For the illustrated embodiment, the application platform 410 includes a bulk data processing engine 412, a query generator 414, a search engine 416 that provides text indexing and other search functionality, and a runtime application generator 420. Each of these features may be implemented as a separate process or other module, and many equivalent embodiments could include different and/or additional features, components or other modules as desired.

The runtime application generator 420 dynamically builds and executes the virtual applications 428 in response to specific requests received from the client devices 440. The virtual applications 428 are typically constructed in accordance with the tenant-specific metadata 438, which describes the particular tables, reports, interfaces and/or other features of the particular application 428. In various embodiments, each virtual application 428 generates dynamic web content that can be served to a browser or other client program 442 associated with its client device 440, as appropriate.

The runtime application generator 420 suitably interacts with the query generator 414 to efficiently obtain multi-tenant data 432 from the database 430 as needed in response to input queries initiated or otherwise provided by users of the client devices 440. In a typical embodiment, the query generator 414 considers the identity of the user requesting a particular function (along with the user's associated tenant), and then builds and executes queries to the database 430 using system-wide metadata 436, tenant specific metadata 438, pivot tables 434, and/or any other available resources. The query generator 414 in this example therefore maintains security of the common database 430 by ensuring that queries are consistent with access privileges granted to the user and/or tenant that initiated the request. In this manner, the query generator 414 suitably obtains requested subsets of data 432 accessible to a user and/or tenant from the database 430 as needed to populate the tables, reports or other features of the particular virtual application 428 for that user and/or tenant.

Still referring to FIG. 4, the data processing engine 412 performs bulk processing operations on the data 432 such as uploads or downloads, updates, online transaction processing, and/or the like. In many embodiments, less urgent bulk processing of the data 432 can be scheduled to occur as processing resources become available, thereby giving priority to more urgent data processing by the query generator 414, the search engine 416, the virtual applications 428, etc.

In exemplary embodiments, the application platform 410 is utilized to create and/or generate data-driven virtual applications 428 for the tenants that they support. Such virtual applications 428 may make use of interface features such as custom (or tenant-specific) screens 424, standard (or universal) screens 422 or the like. Any number of custom and/or standard objects 426 may also be available for integration into tenant-developed virtual applications 428. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. For example, a virtual CRM application may utilize standard objects 426 such as "account" objects, "opportunity" objects, "contact" objects, or the like. The data 432 associated with each virtual application 428 is provided to the database 430, as appropriate, and stored until it is requested or is otherwise needed, along with the metadata 438 that describes the particular features (e.g., reports, tables, functions, objects, fields, formulas, code, etc.) of that particular virtual application 428. For example, a virtual application 428 may include a number of objects 426 accessible to a tenant, wherein for each object 426 accessible to the tenant, information pertaining to its object type along with values for various fields associated with that respective object type are maintained as metadata 138 in the database 130. In this regard, the object type defines the structure (e.g., the formatting, functions and other constructs) of each respective object 426 and the various fields associated therewith.

Still referring to FIG. 4, the data and services provided by the server 402 can be retrieved using any sort of personal computer, mobile telephone, tablet or other network-enabled client device 440 on the network 445. In an exemplary embodiment, the client device 440 includes a display device, such as a monitor, screen, or another conventional electronic display capable of graphically presenting data and/or information retrieved from the multi-tenant database 430. Typically, the user operates a conventional browser application or other client program 442 executed by the client device 440 to contact the server 402 via the network 445 using a networking protocol, such as the hypertext transport protocol (HTTP) or the like. The user typically authenticates his or her identity to the server 402 to obtain a session identifier ("SessionID") that identifies the user in subsequent communications with the server 402. When the identified user requests access to a virtual application 428, the runtime application generator 420 suitably creates the application at run time based upon the metadata 438, as appropriate. As noted above, the virtual application 428 may contain Java, ActiveX, or other content that can be presented using conventional client software running on the client device 440; other embodiments may simply provide dynamic web or other content that can be presented and viewed by the user, as desired.

The multi-tenant database 430 is any sort of repository or other data storage system capable of storing and managing the data 432 associated with any number of tenants. The database 430 may be implemented using any type of conventional database server hardware. In various embodiments, the database 430 shares processing hardware 404 with the server 402. In other embodiments, the database 430 is implemented using separate physical and/or virtual database server hardware that communicates with the server 402 to perform the various functions described herein. In an exemplary embodiment, the database 430 includes a database management system or other equivalent software capable of determining an optimal query plan for retrieving and providing a particular subset of the data 432 to an instance of virtual application 428 in response to a query initiated or otherwise provided by a virtual application 428. The multi-tenant database 430 may alternatively be referred to herein as an on-demand database, in that the multi-tenant database 430 provides (or is available to provide) data at run-time to on-demand virtual applications 428 generated by the application platform 410.

In practice, the data 432 may be organized and formatted in any manner to support the application platform 410. In various embodiments, the data 432 is suitably organized into a relatively small number of large data tables to maintain a semi-amorphous "heap"-type format. The data 432 can then be organized as needed for a particular virtual application 428. For example, conventional data relationships can be established using any number of pivot tables 434 that establish indexing, uniqueness, relationships between entities, and/or other aspects of conventional database organization as desired. Further data manipulation and report formatting is generally performed at run-time using a variety of metadata constructs. Metadata within a universal data directory (UDD) 436, for example, can be used to describe any number of forms, reports, workflows, user access privileges, business logic and other constructs that are common to multiple tenants. Tenant-specific formatting, functions and other constructs may be maintained as tenant-specific metadata 438 for each tenant, as desired. Rather than forcing the data 432 into an inflexible global structure that is common to all tenants and applications, the database 430 is organized to be relatively amorphous, with the pivot tables 434 and the metadata 438 providing additional structure on an as-needed basis. To that end, the application platform 410 suitably uses the pivot tables 134 and/or the metadata 438 to generate "virtual" components of the virtual applications 428 to logically obtain, process, and present the relatively amorphous data 432 from the database 430.

The data management system 10 disclosed herein provides for methods, systems, and techniques for processing the data 432 and related metadata in order to provide rewind capabilities to the tenants in an automated manner. The data management system 10 may be implemented as part of one of the virtual applications 428 and/or part of the data processing engine 412.

Disclosed herein are systems and methods for providing suggestions of related columns for a table operation in a data management system. The apparatus, systems, techniques and articles described can provide rewind capabilities of table change operations.

In one embodiment, a computer implemented method of providing a rewind of table data in a data management system is provided. The method includes: storing, by a processor, a table having table data that defines a plurality of rows and a plurality of columns that define a plurality of cells; capturing, by a processor, change data associated with changes to at least one of the plurality of rows, the plurality of columns, and the plurality of cells; associating, by a processor, the change data with a transaction having a transaction identifier; storing, by a processor, the transaction and the change data in a change bus based on times of the changes; retrieving, by a processor, the change data from the change bus based on a rewind request; performing, by a processor, a rewind of a subset of the changes by performing a reverse operation of the change data relating to the subset of changes and according to a reverse operation order; and outputting, by a processor, a clone of the table based on the rewind of the changes of the table.

These aspects and other embodiments may include one or more of the following features. The transaction includes a transaction identifier, a transaction descriptor, a database session, a user identifier, and pointers to the associated change data. The capturing the changes includes capturing the changes as the changes occur to the table. The capturing the changes includes capturing the changes from a database log file associated with the table.

The method further includes converting, by a processor, the change data from a physical data to logical data, and wherein the associating is based on the logical data.

The storing includes storing the table in a first database on a first memory device, and wherein the change bus is stored on a second memory device. The reverse operation order comprises a reverse chronological order from a current time to a point in time in the past.

The change bus includes a first table for storing the transaction and a second table for storing the change data. The change bus stores the transactions in a reverse chronological order, and wherein the change bus stores the change data in a reverse chronological order.

The retrieving the change data from the change bus includes: retrieving the transactions associated with a point in time identified by the rewind request; and filtering the change data associated with the retrieved transactions based on the point in time identified in the rewind request to produce the subset of changes.

In another embodiment, a computer-implemented system is provided. The system includes a non-transitory computer readable medium configured to store, by a processor, a table having table data that defines a plurality of rows and a plurality of columns that define a plurality of cells; and a processor configured to capture change data associated with changes to at least one of the plurality of rows, the plurality of columns, and the plurality of cells, associate the change data with a transaction having a transaction identifier; store the transaction and the change data in a change bus based on times of the changes, retrieve the change data from the change bus based on a rewind request, performs a rewind of a subset of the changes by performing a reverse operation of the change data relating to the subset of changes and according to a reverse operation order, and output a clone of the table based on the rewind of the changes of the table.

These aspects and other embodiments may include one or more of the following features. The transaction includes a transaction identifier, a transaction descriptor, a database session, a user identifier, and pointers to the associated change data. The processor captures the changes as the changes occur to the table. The processor captures the changes from a database log file associated with the table.

The processor is further configured to convert the change data from a physical data to logical data, and associate based on the logical data. The system of claim 11, wherein the non-transitory computer readable medium includes a first database on a first memory device, and wherein the change bus is stored on a second memory device.

The reverse operation order comprises a reverse chronological order from a current time to a point in time in the past. The change bus comprises a first table for storing the transaction and a second table for storing the change data. The change bus stores the transactions in a reverse chronological order, and wherein the change bus stores the change data in a reverse chronological order.

In another embodiment, a multi-tenants system is provided. The multi-tenant system comprises one or more processors and non-transient computer readable media coupled to the one or more processors wherein the non-transient computer readable media embodies programming instructions configurable to perform a method. The method includes: storing, by a processor, a table having table data that defines a plurality of rows and a plurality of columns that define a plurality of cells; capturing, by a processor, change data associated with changes to at least one of the plurality of rows, the plurality of columns, and the plurality of cells; associating, by a processor, the change data with a transaction having a transaction identifier; storing, by a processor, the transaction and the change data in a change bus based on times of the changes; retrieving, by a processor, the change data from the change bus based on a rewind request; performing, by a processor, a rewind of a subset of the changes by performing a reverse operation of the change data relating to the subset of changes and according to a reverse operation order; and outputting, by a processor, a clone of the table based on the rewind of the changes of the table.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to object models, web pages, multi-tenancy, cloud computing, on-demand applications, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first," "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another. In one or more exemplary embodiments, the subject matter described herein is implemented in conjunction with a virtual customer relationship management (CRM) application in a multi-tenant environment.

While at least one exemplary embodiment has been presented, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A computer implemented method of providing a rewind of table data in a data management system, the method comprising:

storing, by a processor, a table having table data that defines a plurality of rows and a plurality of columns that define a plurality of cells;

capturing, by a processor, change data associated with changes to at least one of the plurality of rows, the plurality of columns, and the plurality of cells;

associating, by a processor, the change data with a transaction having a transaction identifier;

storing, by a processor, the transaction and the change data in a change bus based on times of the changes;

retrieving, by a processor, the change data from the change bus based on a rewind request;

performing, by a processor, a rewind of a subset of the changes by performing a reverse operation of the change data relating to the subset of changes and according to a reverse operation order; and outputting, by a processor, a clone of the table based on the rewind of the changes of the table.

2. The method of claim 1, wherein the transaction includes a transaction identifier, a transaction descriptor, a database session, a user identifier, and pointers to the associated change data.

3. The method of claim 1, wherein the capturing the changes comprises capturing the changes as the changes occur to the table.

4. The method of claim 1, wherein the capturing the changes comprises capturing the changes from a database log file associated with the table.

5. The method of claim 1, further comprising converting, by a processor, the change data from a physical data to logical data, and wherein the associating is based on the logical data.

6. The method of claim 1, wherein the storing comprises storing the table in a first database on a first memory device, and wherein the change bus is stored on a second memory device.

7. The method of claim 1, wherein the reverse operation order comprises a reverse chronological order from a current time to a point in time in the past.

8. The method of claim 1, wherein the change bus comprises a first table for storing the transaction and a second table for storing the change data.

9. The method of claim 8, wherein the change bus stores the transactions in a reverse chronological order, and wherein the change bus stores the change data in a reverse chronological order.

10. The method of claim 1, wherein the retrieving the change data from the change bus comprises:

retrieving the transactions associated with a point in time identified by the rewind request; and filtering the change data associated with the retrieved transactions based on the point in time identified in the rewind request to produce the subset of changes.

11. A computer implemented system of providing a rewind of table data in a data management system, the system comprising:

a non-transitory computer readable medium configured to store, by a processor, a table having table data that defines a plurality of rows and a plurality of columns that define a plurality of cells;

a processor configured to capture change data associated with changes to at least one of the plurality of rows, the plurality of columns, and the plurality of cells, associate the change data with a transaction having a transaction identifier; store the transaction and the change data in a change bus based on times of the changes, retrieve the change data from the change bus based on a rewind request, performs a rewind of a subset of the changes by performing a reverse operation of the change data relating to the subset of changes and according to a reverse operation order, and output a clone of the table based on the rewind of the changes of the table.

12. The system of claim 11, wherein the transaction includes a transaction identifier, a transaction descriptor, a database session, a user identifier, and pointers to the associated change data.

13. The system of claim 11, wherein the processor captures the changes as the changes occur to the table.

14. The system of claim 11, wherein the processor captures the changes from a database log file associated with the table.

15. The system of claim 11, wherein the processor is further configured to convert the change data from a physical data to logical data, and associate based on the logical data.

16. The system of claim 11, wherein the non-transitory computer readable medium includes a first database on a first memory device, and wherein the change bus is stored on a second memory device.

17. The system of claim 11, wherein the reverse operation order comprises a reverse chronological order from a current time to a point in time in the past.

18. The system of claim 11, wherein the change bus comprises a first table for storing the transaction and a second table for storing the change data.

19. The system of claim 18, wherein the change bus stores the transactions in a reverse chronological order, and wherein the change bus stores the change data in a reverse chronological order.

20. An enterprise social networking system comprising one or more processors and non-transient computer readable media coupled to the one or more processors, the non-transient computer readable media embodying programming instructions configurable to perform a method, the method comprising:
- storing, by a processor, a table having table data that defines a plurality of rows and a plurality of columns that define a plurality of cells;
- capturing, by a processor, change data associated with changes to at least one of the plurality of rows, the plurality of columns, and the plurality of cells;
- associating, by a processor, the change data with a transaction having a transaction identifier;
- storing, by a processor, the transaction and the change data in a change bus based on times of the changes;
- retrieving, by a processor, the change data from the change bus based on a rewind request;
- performing, by a processor, a rewind of a subset of the changes by performing a reverse operation of the change data relating to the subset of changes and according to a reverse operation order; and
- outputting, by a processor, a clone of the table based on the rewind of the changes of the table.

* * * * *